US007130510B2

(12) United States Patent
Lester et al.

(10) Patent No.: US 7,130,510 B2
(45) Date of Patent: Oct. 31, 2006

(54) ACTIVE OPTICAL ALIGNMENT OF LASER DIODE ARRAY FOR DRILLING PRECISING HOLES

(75) Inventors: Donald Leroy Lester, Ballston Lake, NY (US); James Wilson Rose, Guilderland, NY (US); Donna Marie Sherman, East Greenbush, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 83 days.

(21) Appl. No.: 10/430,073

(22) Filed: May 6, 2003

(65) Prior Publication Data

US 2004/0223698 A1 Nov. 11, 2004

(51) Int. Cl.
*G02B 6/26* (2006.01)

(52) U.S. Cl. .............................. 385/52; 385/90; 385/92

(58) Field of Classification Search .................... 385/52
See application file for complete search history.

(56) References Cited

U.S. PATENT DOCUMENTS

| 4,504,727 | A | 3/1985 | Melcher et al. |
| 5,710,063 | A | 1/1998 | Forehand et al. |
| 6,211,485 | B1 | 4/2001 | Burgess |
| 6,419,405 | B1* | 7/2002 | Boscha ........................ 385/93 |
| 6,447,171 | B1* | 9/2002 | Demangone et al. ......... 385/59 |
| 6,480,651 | B1 | 11/2002 | Rabinski |
| 6,511,236 | B1 | 1/2003 | Webjorn et al. |
| 6,526,206 | B1 | 2/2003 | Kunkel et al. |
| 6,676,302 | B1* | 1/2004 | Cheng et al. ................. 385/88 |
| 6,807,328 | B1* | 10/2004 | Farah .......................... 385/14 |
| 2002/0003930 | A1* | 1/2002 | Paris ........................... 385/50 |
| 2002/0034351 | A1 | 3/2002 | Wickman et al. |
| 2003/0189963 | A1* | 10/2003 | Deppe et al. ................. 372/96 |

\* cited by examiner

*Primary Examiner*—Nikita Wells
*Assistant Examiner*—Phillip A Johnston
(74) *Attorney, Agent, or Firm*—Scully, Scott, Murphy & Presser, P.C.

(57) ABSTRACT

Active optical alignment of plastic chip-scale-package (450) laser and photo detecting diode devices (420) is provided by use of an active probe (120) to make alignment structures (300), such as précising holes, that are used to align the optical device (420) into a transmit/receive module. An optical connector (140), such as an optical fiber, transmits light to, or receives light from, the optical device (420). Using an electrical contact (115, 120), laser diode devices are lighted or photo detecting diode devices are electrically interfaced. The optical connector (140) steps to, locates and contacts each optical device on a fabricated frame of multiple devices. The optical connector (140) is manipulated to an optimal coupling position where the best signal, either optical or electrical, is obtained. An optimal position for making the précising holes, e.g., using a machining laser, is determined as an offset from the optimal position of the optical connector.

18 Claims, 6 Drawing Sheets

ACTIVE OPTICAL ALIGNMENT OF LASER DIODE ARRAY FOR DRILLING PRECISING HOLES

BACKGROUND OF THE INVENTION

1. Field of Invention

The invention relates generally to the field of electronics manufacturing and, more specifically, to a method and apparatus for determining optimal positions for making alignment holes in the packaging of a optical diode device, such as a laser diode or photo detecting diode.

2. Description of Related Art

Optical diode devices are semiconductor devices that are commonly used in many applications. Transmitting devices output light in response to an electrical excitation. The devices output incoherent light when the excitation is below a lasing threshold. In this case, the devices operate as light-emitting diodes due to spontaneous emission. Once the lasing threshold is reached, the devices output laser light due to stimulated emission, which can be in any spectrum, whether visible or not. Moreover, photo detecting diodes, such as p-i-n diodes, receive a light input and produce a corresponding electrical output. The photo detecting diodes, also known as pixels, measure photon flux at different spatial points.

Transmitting and receiving optical devices are therefore very useful in transmitters and receivers for fiber optic communications and many other applications. Moreover, during manufacture, 1-D and 2-D arrays of the optical devices may be produced to increase their effectiveness.

The optical device must be carefully aligned when it is installed in the end use device, such as a customer transceiver assembly. Typically, the optical device is carried in packaging in which alignment structures such as through holes are made for mating with, e.g., pins, in the end use device. The alignment structures are positioned in a specific orientation with respect to the optical device. For example, the alignment structures may be positioned so that collimating optics for an optical fiber are centered over the optical device.

However, accurately making the alignment structures is problematic. For example, making précising, e.g., alignment, holes to align optical diode devices is currently accomplished by manually aligning to each device, or to portions of a diode array. This type of alignment is very subjective and operator intensive. The quality of the hole positioning is not determined until the module is completed and a coupling test is done. If the device does not couple well enough, then it is rejected. After précising holes are drilled, a separate hole alignment measurement is made. The correlation between the alignment measurement and the coupling quality has never been made. The correlation between the two measurements has many variables and interactions such as axis skew in more than the single-plane hole alignment measurement. In the past, the resulting yield was accepted. For example, parts were rejected from processing for hole alignment errors greater than, e.g., +/−10 microns, or a coupling loss greater than a customer specification, before assembly into the transceiver module.

BRIEF SUMMARY OF THE INVENTION

To overcome these and other deficiencies in the prior art, the present invention describes a method and apparatus for determining the optimal position for making alignment structures such as holes in the packaging of an optical diode device.

In one aspect, a method is provided for determining an optimal position for an alignment structure for packaging in which a light-emitting optical device is positioned. The method includes electrically energizing the light-emitting optical device to cause the optical device to emit light, obtaining different readings of the light, such as intensity, using an optical connector, e.g., an optical fiber, at different locations within the emitted light, and determining an optimal position of the optical connector with respect to the optical device according to the different readings. The optimal position for the alignment structure is determined according to the optimal position of the optical connector, e.g., using an offset distance and direction. For example, the optimal position for the optical connector may be where the emitted light is the strongest, e.g., has a maximum intensity, for a single laser diode. For an array of diodes, the optimum position for the connector may be based on where the light output of the array as a whole is strongest. Or, the output readings of specific diodes in an array, such as the diodes at the ends of an array, may be made, where a respective optimal position for each end diode is determined based on the location of its strongest output, and a single overall optimal position for the optical connector is determined based on an average of the respective optimal positions.

When the optical device is subsequently installed using the alignment structure, it will be optimally aligned so that the maximum light output or input is transmitted or received, respectively. The alignment structure may be one or more holes that are machined into the packaging for the optical devices using a machining laser.

In another aspect, a method is provided for determining an optimal position for an alignment structure for packaging in which a photo detecting optical device is positioned. The method includes optically energizing the photo detecting optical device using an optical connector at different positions with respect to the photo detecting optical device to cause the optical device to produce corresponding electric outputs, obtaining different readings of the electric outputs, such as current or voltage level, and determining an optimal position for the optical connector according to the different readings. The optimal position for the alignment structure is determined based on the optimal position for the optical connector.

For an array of transmitting or photo detecting diodes, the optimum position may be based on where the optical or electrical output of the array as a whole is strongest. Or, the optical or electrical output readings of specific diodes in an array, such as the diodes at the ends of an array, may be made, where a respective optimal position for each end diode is determined based on the position of its strongest output, and a single overall optimal position for the optical connector is determined based on an average of the respective optimal positions. The optimal position for the alignment structure is determined based on the single overall optimal position for the optical connector.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Processing of an optical device generally includes the steps of placing the optical device in an alignment position, optical coupling position, and machining position.

Figure 1:
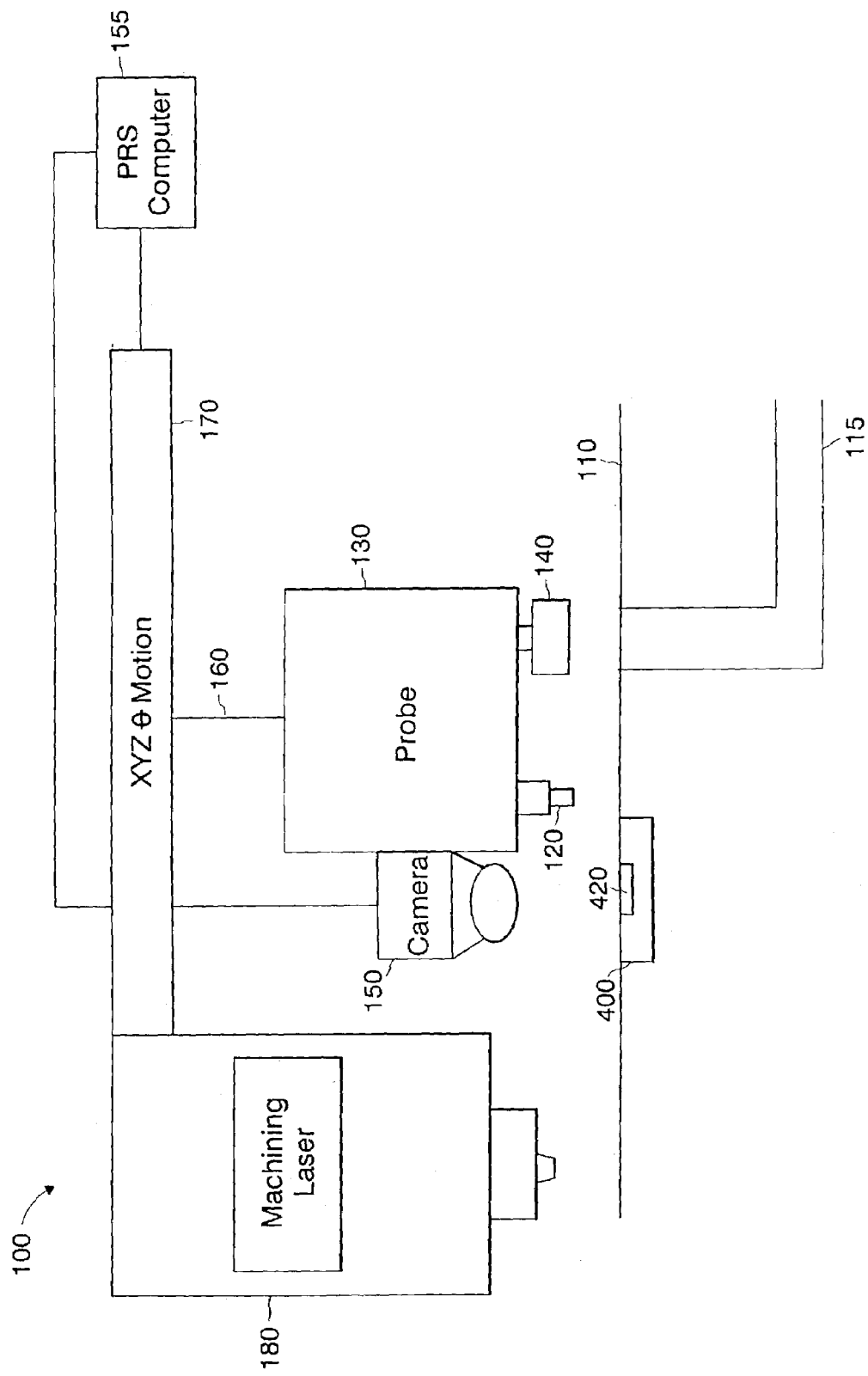
FIG. 1 illustrates an active alignment system in an alignment position.
Figure 4:
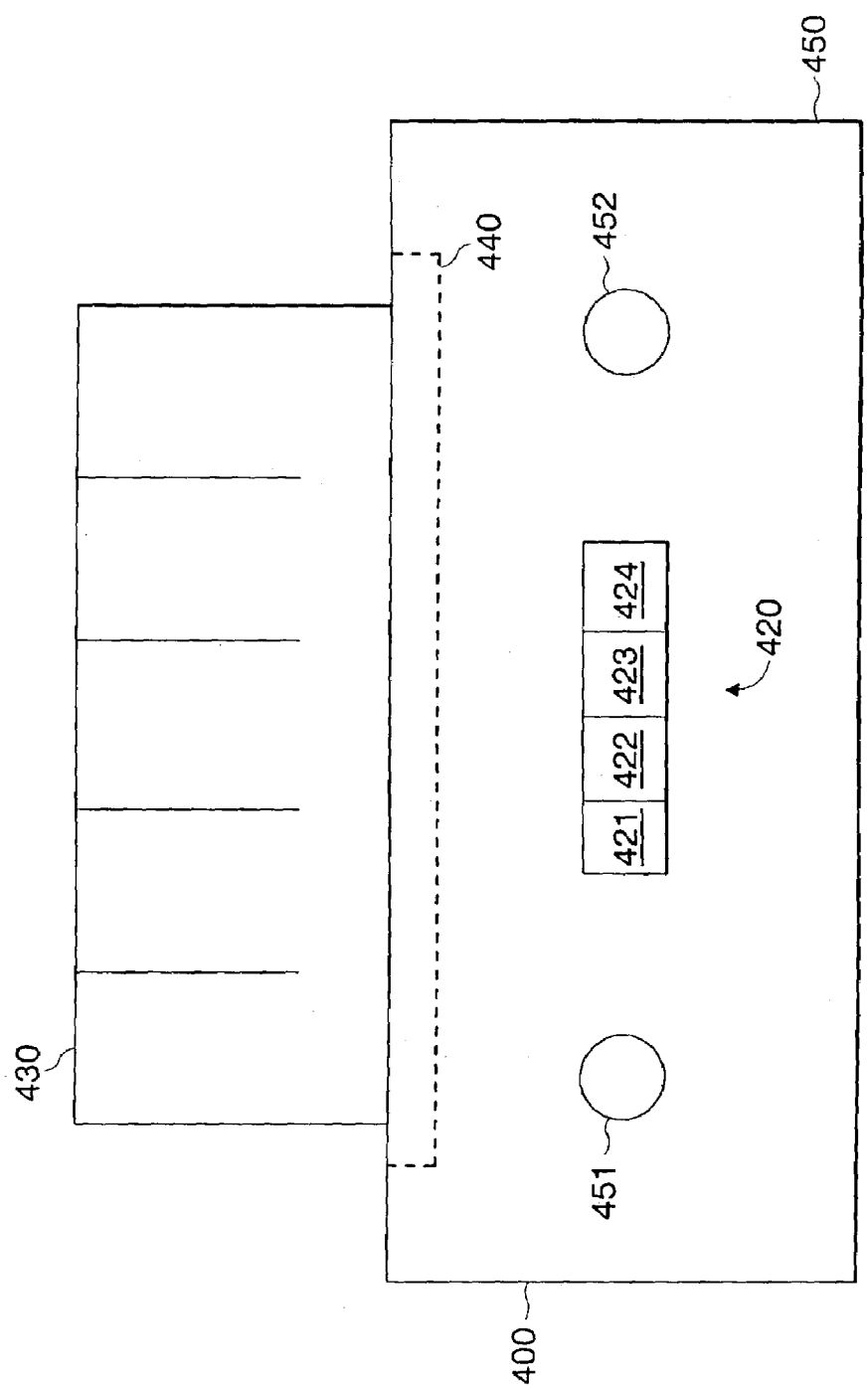
FIG. 4 illustrates an optical device and packaging.

FIG. 1 illustrates an active alignment system in an alignment position. The system, shown generally at 100, includes a flex frame surface with bus metal 110 on which an optical module 400 is positioned. As shown in FIG. 4, the optical module 400 includes an optical device 420, such as a 1×4 array of individual laser diodes or photo detecting diodes 421–424. The optical device 420 is carried within a package 450, such as a molded plastic chip-scale-package, of the optical module 400. The optical device 420 is exposed on one side through a film, such as Dupont Kapton® film.

Electrical interface fingers 430 are coupled to the optical device 420 via an electrical contact portion 440 of the module 400. Alignment structures 451 and 452, such as holes, are made after an optimal position for them has been determined, as discussed below. Electrical signals may be provided to, or received from, the optical device 420 via the electrical interface fingers 430 using either or both of an electrical connection 115 to the flex frame bus metal and an electrical contact 120 associated with a probe 130. When an electrical connection 115 to the flex frame bus metal is used, the electrical interface fingers 430 may extend to a sacrificial pad on the flex frame surface 110, where a tip portion of the electrical interface fingers are cut off after use.

The probe 130 may also have an associated optical connector 140 such as a fiber optic connector for providing light to, or receiving light from, the optical module 400. The fiber optic connector may include a single mode or multimode fiber.

In FIG. 1, a camera 150 may be part of a machine vision system, which is optionally used to obtain an initial positioning or alignment for the optical module 400. A pattern recognition system (PRS) 155 receives and processes image data of the optical module 400 from the camera 150 to determine a position of the optical device 420. Interface cables 160 are provided between the probe 130 and an xyzθ motion device 170 which can adjust the position of the camera 150, probe 130, electrical contact 120, and/or optical connector 140 with respect to the optical module 400 and the flex frame surface 110. Independent control of the movement of each component 120, 130, 140 or 150 may be provided. The position of the flex frame surface 110 may also be controlled independently. The xyzθ motion device 170 may also control movement of a machining laser 180, which is provided for making the alignment structures in the packaging 450 of the optical module 400. Note that while a single optical module 400 is shown for clarity, batch processing of a number of modules may occur at the same time.

Each optical device on the manufacturing frame 110 is connected mechanically, electrically and optically via the probe 130, which may be located within an enclosure of the machining laser 180. Additional electrical connections can be made using the bus metal on the manufacturing frame. The optical connector 140 has been previously determined to be of superior dimensional accuracy.

Figure 2:
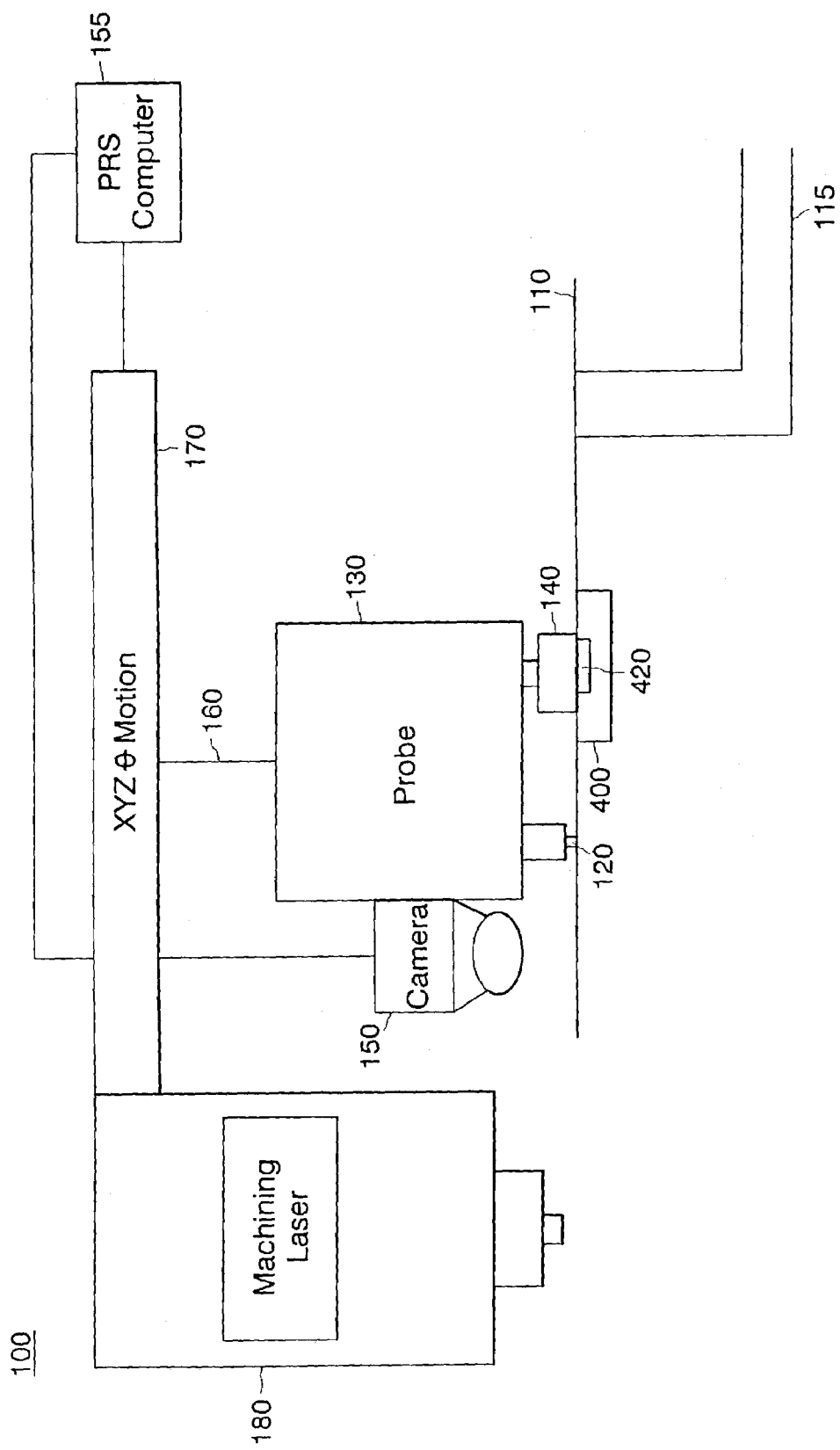
FIG. 2 illustrates an active alignment system in an optical coupling position.

The optical module 400 is positioned in view of the machine vision alignment camera 150, which provides an initial visual alignment to the optical module 400 and the optical device 420. The probe 130 and/or optical connector 140 are then precisely aligned to the optical device 420 in an optical coupling position, as shown in FIG. 2, using the output signal, either optical or electrical, to obtain the best signal and thus the optimal alignment position. The optical connector 140 may contact the optical device 420 in the optical coupling position. Optionally, the optical connector 140 includes optics such as a micro lens for collimating the light output from the optical device 420. Based on the initial alignment using the camera 150, it may be determined that the optical connector 140 should be moved a specific distance in order to align the optical device 420 so that it is approximately centered with respect to the optical connector 140. Once the optical connector 140 is positioned at an initial position with respect to the optical device 420, readings can be made to determine an optimal position for the optical connector 140 with respect to the optical device 420. An optimal position for the alignment structure can then be determined based on an offset distance and direction from the optimal position for the optical connector 140. The optical module 400 can then be positioned accordingly with respect to the machining laser 180, which creates one or more alignment structures, typically using a subtractive process of the packaging 450 of the optical module 400.

When the optical module 400 is a transmitting laser or LED diode module, the module 400 is electrically energized via the electrical interface fingers 430 to cause the optical device 420 to produce a light output. For a transmitting laser, the diode may be energizing below, at, or above the lasing threshold. Any type of transmitting laser diode may be used, including high power and low power types. For example, a laser used for fiber optic communications may consume 5–10 milliwatts per diode, and operate at a frequency of 1.5–10 GHz. The laser may be turned on and off for each reading to prevent heat buildup, if necessary. Moreover, single or multiple frequency laser diodes may be accommodated. The light from the optical device 420 is received via the optical connector 140 and routed to an appropriate sensor and control circuitry to obtain a reading of the light strength, e.g., intensity. Additional readings of the light output are then taken at different locations within the emitted light by moving the relative position of the optical device 420 to the optical connector 140. This may be achieved by moving the positions of either or both of the optical connector 140 and the flex frame surface 110, which carries the optical module 400.

Figure 5A:
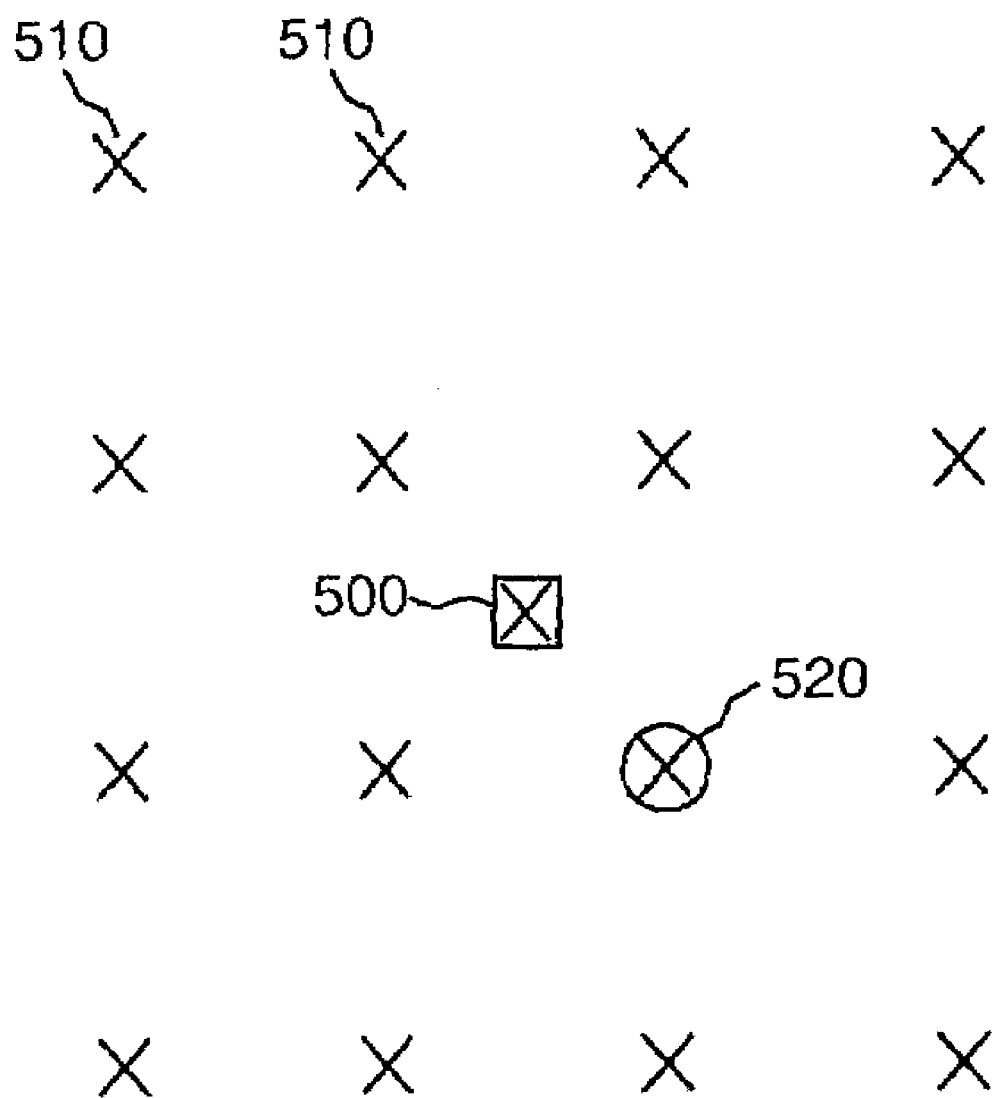
FIG. 5(a) illustrates a first pattern for obtaining readings of an optical device.
Figure 5B:
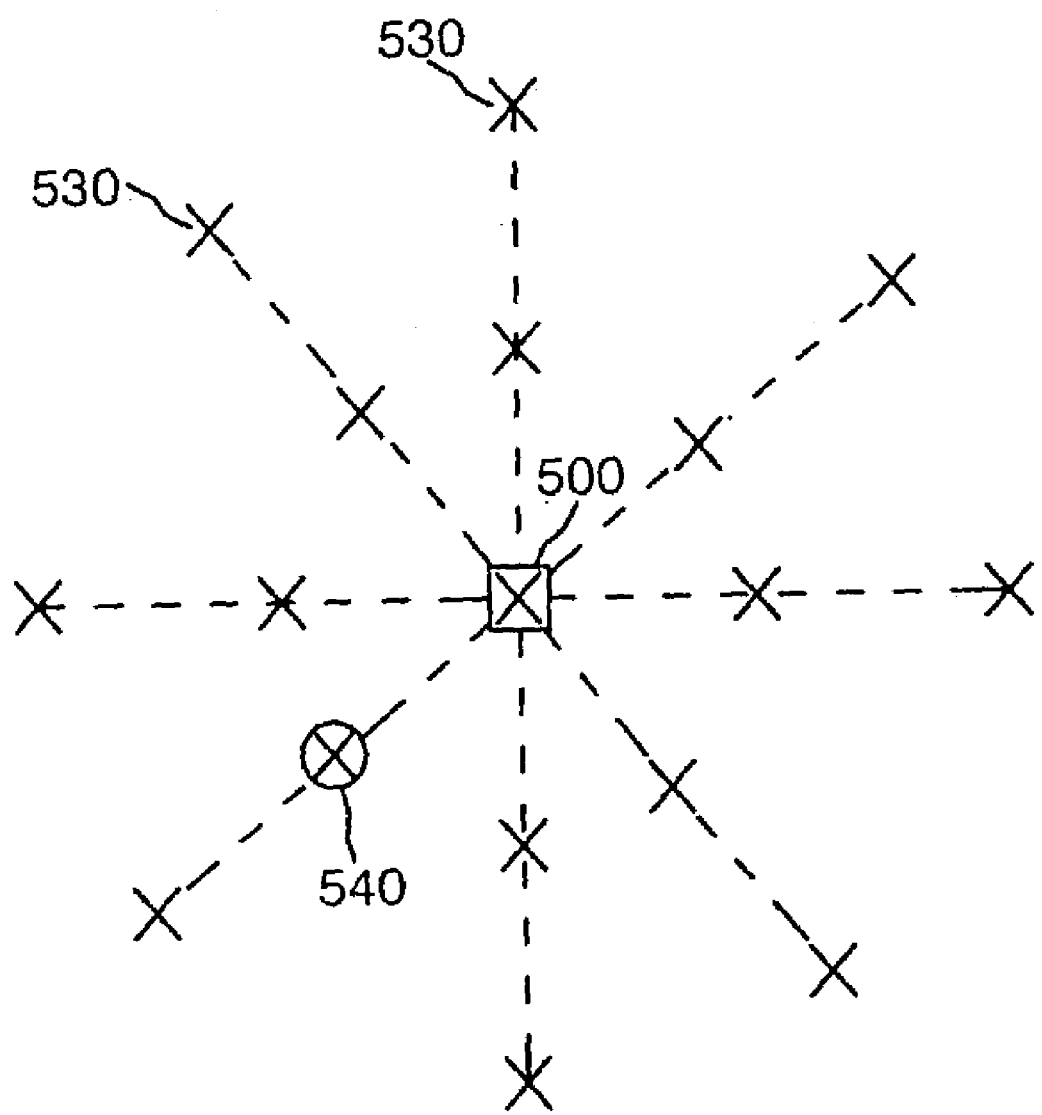
FIG. 5(b) illustrates a second pattern for obtaining readings of an optical device.

The light output readings of the optical device 420 may be obtained at different locations based on a predetermined pattern, such as shown in FIG. 5(a) or FIG. 5(b). In FIG. 5(a), the initial location at which a reading is taken is indicated at 500. Additional readings are taken at locations indicated by "X"s 510 in the pattern. Thus in the example, sixteen readings are taken in a square grid addition to the initial reading. Note that the initial reading itself may be part of the pattern, and not necessarily at the exact center of the pattern. Based on these readings, an optimal position of the optical connector 140 with respect to the optical device 420, e.g., position 520, is determined. This location can be determined using a number of algorithms. In one approach, the optimal position is the position of the highest intensity reading. In another approach, the optimal position is obtained by interpolation of a number of locations with the highest intensity readings, e.g., the top four locations. In another approach, the optimal position is based on a center of mass of all intensity readings. Predefined ranges of valid readings may be defined so that outlying readings are dropped. Moreover, if the best signal obtained is below a predetermined specification, the optical module may be rejected. The different readings may be stored in a temporary memory, e.g., within the probe 130 or elsewhere, while each optical module is being processed. The readings may be stored in a long-term memory for historical analysis as well, if desired.

In the pattern of FIG. 5(b), the initial reading is taken at a location 500, while subsequent readings, e.g., 530, are taken along radial spokes. An example optimal position 540 is determined. Other patterns for obtaining readings may also be used, such as a spiral pattern that extends from a central point. Furthermore, an adaptive reading algorithm may be used, e.g., by calculating intensity gradients within the light output of the optical device 420, so that readings in all locations in the pattern need not be taken. Also, continuous rather than discrete measurements may be made as the position of the optical device 420 with respect to the optical connector 140 varies.

The optimal position for making an alignment structure in the packaging of the optical module 400 is determined based on the optimal coupling position of the optical device 420 with respect to the optical connector 140 as determined by the readings. For example, the optimal position for making an alignment structure may be a certain offset from the optimal coupling position/of the optical device in a specified orientation, e.g., 0 microns in the x direction, 2000 microns in the y direction. Optimal positions for multiple alignment structures may be identified as well.

Figure 3:
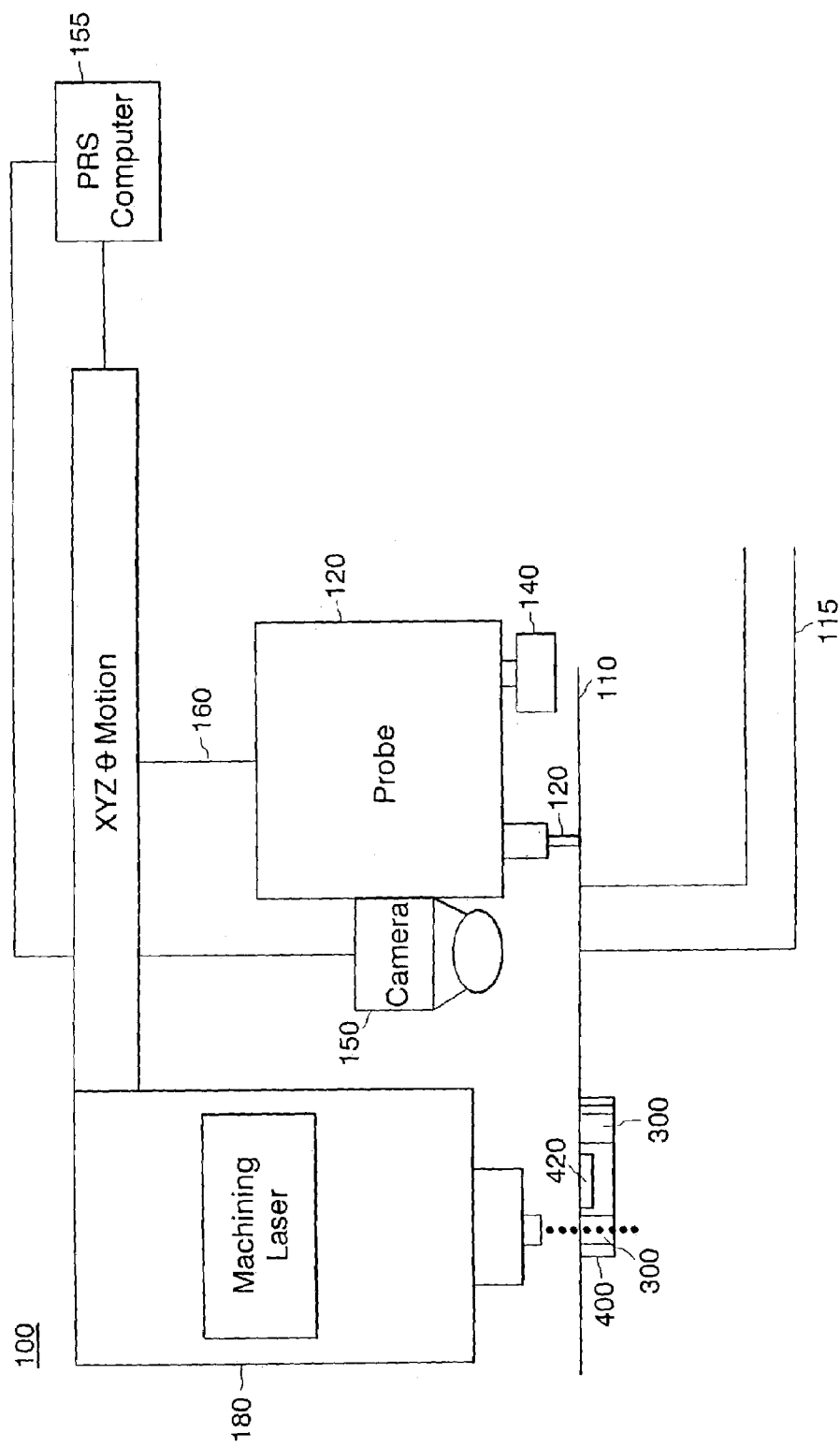
FIG. 3 illustrates an active alignment system in a machining position.

Once the optimal position for making an alignment structure is determined, the optical module 400 is positioned with respect to the machining laser 180 in a machining position, as shown in FIG. 3, to provide one or more alignment structures 300. One supplier of a machining laser drill or mill is Electro Scientific Industries, Inc. Portland, Oreg. A mechanical machining device, other than a laser, may also be used. The alignment structure can include essentially any device that provides alignment of the optical device. For example, it may be a through hole, blind hole, notch, edge cut, marking such as a "+" sign, or the like. When the alignment structures 300 are holes, connector preciser pins in the holes make the final optical alignment at assembly. The degree of mechanical alignment directly determines the optical alignment quality of the module. Note that the positioning of the optical module 400 with respect to the various components 120, 130, 140, 150, 180 may be achieved by moving them relative to the optical module 400, and/or by moving the optical module 400 relative to them. Testing may be performed to confirm that the alignment structures have been optimally positioned.

For a receiving diode, e.g., photo detector, such as a p-i-n diode, analogous techniques are applied. The optical device 420 is positioned with respect to the optical connector 140, which in this case optically energizes the optical device 420 by providing an optical input such as a laser input that is received by the optical device 420. The received light is converted to a corresponding electrical output at the electrical interface fingers 430 that is detected by the electrical contact 120 or the electrical connection 115 to the flex frame bus metal. The electrical output is processed using control circuitry, e.g., within the probe 130 or coupled to the electrical connection 115 but not specifically shown.

The optical connector 140 is positioned at different locations with respect to the photo detecting optical device 420, e.g., as discussed above using the patterns of FIG. 5(a) or 5(b), for example, to cause the optical device 420 to produce corresponding electric outputs. Readings of the electric outputs, such as current or voltage level, are processed to determine an optimal position of the optical device 420 with respect to the optical connector 140. The optimal position for the alignment structure can then be determined as an offset therefrom.

For an array of photo detecting diodes, the optimum location of the optical connector 140 may be based on the optical connector to optical device position at which the electrical or optical output of the array as a whole is strongest. Or, the electrical output readings of specific diodes in an array, such as the diodes at the ends of an array, may be made, where a respective optimal position for each end diode is determined based on the location of its strongest output. Respective optimal positions for the alignment structure are obtained using appropriate offsets from the respective optimal positions for each end diode. A single overall optimal position for the alignment structure may then be determined based on an average or center of mass of the respective optimal positions. For example, if the optimal position for the optical connector 140 for one end diode indicates the optimal position for the alignment structure is at a position x=10 microns, and the optimal position for the optical connector 140 for another end diode indicates the optimal position for the alignment structure is at a position x=12 microns, the optimal position can be taken at x=11 microns. Note that the offset distance to the optimal position for the alignment structure accounts for the relative position of the end diodes, in this example.

In another example, optimal optical coupling positions are determined for each diode in a 1×4 array. Using the appropriate offsets, assume the optimal positions for the alignment structure are at x=9 microns, 10 microns, 11 microns and 13 microns. Note that an offset in one direction only is assumed for simplicity. In this case, the final optimal position for the alignment structure can be the average position, x=(43 microns/4)=10.75 microns. Other algorithms may be developed, such as eliminating the highest and lowest positions, and averaging the remaining positions. This approach results in a position of x=10.5 microns. The offset calculations account for the relative locations of the diodes in the array. For example, a 250 micron pitch between diodes in a die is common. Both 1-D and 2-D arrays may be accommodated by positioning an appropriately sized optical connector next to the array.

In another embodiment, the machining laser is aligned to the lighted device using only the vision alignment and the holes made based on that alignment.

Accordingly, it can be seen that the invention provides an efficient, cost effective method and apparatus for active and precise positioning of alignment structures for an optical device. Benefits include minimized yield loss in process and at the customer transceiver assembly.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for determining an optimal position for at least one alignment structure for packaging in which a light-emitting optical device is positioned comprising:
   electrically energizing the light-emitting optical device to cause the optical device to emit light;
   obtaining a plurality of different readings of the emitted light using an optical connector that is positioned at a corresponding plurality of different positions in an x-y plane within the emitted light;
   determining an optimal position in the x-y plane of the optical connector with respect to the light-emitting optical device according to the different readings;
   determining the optimal position in the x-y plane for the at least one alignment structure according to the optimal position of the optical connector; and
   providing the at least one alignment structure by a subtractive process using a machining laser positioned relative to the optical connector and moving the machining laser to the optimal position of the optical connector, wherein said alignment structure is provided after said optimal position has been determined.

2. The method of claim 1, wherein:
   the different positions at which the optical connector is positioned are determined according to a predetermined pattern in the x-y plane.

3. The method of claim 1, wherein:
   the light-emitting optical device comprises at least one laser diode.

4. The method of claim 3, wherein:
   the light-emitting optical device is electrically energized at least at a lasing threshold.

5. The method of claim 3, wherein:
   the light-emitting optical device is electrically energized below a lasing threshold.

6. The method of claim 1, wherein:
   the light-emitting optical device comprises at least one array comprising a plurality of individual laser diodes, and the different readings are obtained for emitted light from at least two of the individual laser diodes.

7. The method of claim 1, wherein:
   the optimal position for the at least one alignment structure is determined based on an offset in the x-y plane from the optimal position of the optical connector.

8. The method of claim 1, further comprising:
   determining an initial position in the x-y plane for positioning the optical connector in the emitted light using a machine vision system.

9. A method for determining an optimal position for at least one alignment structure for packaging in which a photo detecting optical device is positioned comprising:
   optically energizing the photo detecting optical device using an optical connector that is positioned at a plurality of different positions in an x-y plane with respect to the photo detecting optical device to cause the photo detecting optical device to produce a corresponding plurality of electric outputs;
   obtaining a plurality of different readings of the electric outputs;
   determining an optimal position in the x-y plane of the optical connector with respect to the photo detecting optical device according to the different readings;
   determining the optimal position in the x-y plane for the at least one alignment structure according to the optimal position of the optical connector; and
   providing the at least one alignment structure by a subtractive process using a machining laser positioned relative to the optical connector and moving the machining laser to the optimal position of the optical connector, wherein said alignment structure is provided after said optimal position has been determined.

10. The method of claim 9, wherein:
    the different positions at which the optical connector is positioned are determined according to a predetermined pattern in the x-y plane.

11. The method of claim 9, further comprising:
    determining an initial position in the x-y plane for positioning the optical connector with respect to the photo detecting optical device using a machine vision system.

12. The method of claim 9, wherein:
    the photo detecting optical device comprises at least one photo detecting diode.

13. The method of claim 9, wherein:
    the photo detecting optical device comprises at least one array comprising a plurality of individual photo detectors, and the different readings are obtained for electric outputs from at least two of the individual photo detectors.

14. An apparatus for determining an optimal position for at least one alignment structure for packaging in which a light-emitting optical device is positioned comprising:
    means for electrically energizing the light-emitting optical device to cause the optical device to emit light;
    means for obtaining a plurality of different readings in an x-y plane of the light using an optical connector that is positioned at a corresponding plurality of different positions within the emitted light;
    means for determining an optimal position in the x-y plane of the optical connector with respect to the light-emitting optical device according to the different readings;
    means for determining the optimal position in the x-y plane for the at least one alignment structure according to the optimal position of the optical connector; and
    means for providing the at least one alignment structure by a subtractive process in the x-y plane, the means being positioned relative to the optical connector and being moveable to the optimal position of the optical connector, wherein the means being provided after said optimal position has been determined.

15. An apparatus for determining an optimal position for at least one alignment structure for packaging in which a photo detecting optical device is positioned comprising:
    an optical connector for optically energizing the photo detecting optical device that is positioned at a plurality of different positions in an x-y plane with respect to the photo detecting optical device to cause the photo detecting optical device to produce a corresponding plurality of electric outputs;
    means for obtaining a plurality of different readings of the electric outputs;
    means for determining an optimal position in the x-y plane of the optical connector with respect to the photo-detecting optical device according to the different readings;
    means for determining the optimal position in the x-y plane for the at least one alignment structure according to the optimal position of the optical connector; and means for providing the alignment structure by a subtractive process in the x-y plane, the means being positioned relative to the optical connector and being moveable to the optimal position of the optical connector, wherein the means being provided after said optimal position has been determined.

16. The method of claim 2, wherein:
the predetermined pattern in the x-y plane comprises at least one of a grid pattern, a radial spoke pattern, and a spiral pattern.

17. The method of claim 10, wherein:
the predetermined pattern in the x-y plane comprises at least one of a grid pattern, a radial spoke pattern, and a spiral pattern.

18. The method of claim 9, wherein:
the optimal position for the at least one alignment structure is determined based on an offset in the x-y plane from the optimal position of the optical connector.

* * * * *